Patented June 17, 1930

1,764,837

UNITED STATES PATENT OFFICE

WALTER D. HODSON AND ROY E. COLEMAN, OF CHICAGO, ILLINOIS, ASSIGNORS, BY MESNE ASSIGNMENTS, TO THE HODSON CORPORATION, OF CHICAGO, ILLINOIS, A CORPORATION OF DELAWARE

LUBRICATING COMPOUND

No Drawing. Application filed March 15, 1924. Serial No. 699,445.

The present invention relates to improvements in lubricating compounds, and more particularly to such compounds having to a high degree the property of retaining their film form when subjected to conditions involving heavy loads, high bearing temperatures, or both. Such conditions arise, for example, in metal rolling mills, vehicle transmission and differential gears, and the like.

In accordance with the present invention, we incorporate into a suitable mineral oil lubricant a suitable proportion, say 0.5% to 25%, of aluminum oleate or other suitable metallic soap capable of forming a gel when incorporated in the oil. Other suitable soaps for this purpose are the linoleate and tungate of aluminum, the corresponding soaps of zinc and the like. We also incorporate into the oil varying proportions, say 1% to 50% of finely ground asbestos, which is held in uniform admixture in the batch by the aluminum oleate or other soap employed. Small proportions, say up to 3% of degras may also be included if desired.

In preparing the lubricant, the aluminum oleate or other soap is melted with a small amount of oil at a suitable temperature, say 200 to 250° F., and additional oil is supplied while the mass is thoroughly mixed until oil to five to six times the weight of the soap has been added. The temperature is maintained at, say 200 to 250° F. and the mixing operation is continued until the aluminum oleate is thoroughly dispersed through the oil.

The main bulk of the oil to be incorporated in the mixture (to which degras, if used, has been added) is heated in a suitable tank to say 150 to 250° F. and the mixture of soap and oil is thoroughly incorporated thereinto by any suitable mechanical stirring device. Due to the gelling properties of the aluminum oleate, the batch assumes an apparent lumpy character, although when spread out upon a smooth surface it is readily apparent that there is no actual lumpiness of the material. The asbestos fibre is then slowly sprinkled in and thoroughly incorporated in the oil mixture, which is continually stirred until a thoroughly homogeneous mass has been produced. The fibre may be of varying degrees of fineness in accordance with the use to which the lubricant is to be put.

The batch is gradually cooled off and is finally transferred to suitable containers.

The lubricant prepared in accordance with the present invention may be of varying consistance, from very soft to very heavy, depending upon the character of oil and proportions of asbestos employed therein. In all its forms it has the characteristics of an elastic gel, and it is also characterized by the fact that a film of the lubricant does not break down even when subjected to heavy pressures under comparatively high temperatures, such as exist, for example, in the bearings of rolling mills.

The following specific example illustrates a form of fairly heavy lubricant prepared in accordance with the present invention. In a cylinder oil of about 25° Bé. and about 200 seconds Saybolt viscosity at 210° F., we incorporate from 15 to 23% of asbestos, from 2½ to 5% of aluminum oleate (or somewhat smaller quantities of the linoleate or tungate) and up to 3% of degras. These substances are incorporated in the oil in substantially the manner above set forth. The proportions of linoleate or tungate employed, if either is used in place of the oleate, are sufficient to give substantially the same gel-like characteristics as the oleate when the latter is used in the proportions specified. The variations in proportions indicated are due to varying characteristics of the specific ingredients employed, depending upon their source and precise physical state. In any case, the proportion of any specific ingredient employed is varied within narrow limits as indicated to produce specific properties in the lubricant. As more specific examples, with certain ingredients, a product has been produced comprising 78.5% oil; 16% asbestos; 2.5% aluminum oleate and 3% degras. Another product within the scope of this invention was produced consisting of 65% oil, 30% asbestos, and 5% aluminum oleate. Still another specific product consisted of 95% oil, 3.5% asbestos, 0.6% aluminum oleate, 0.9% degras.

Lubricants of varying characters may be formed, as is readily apparent, by varying the nature of the oil and the proportion of the ingredients incorporated therein. It is not intended that the scope of the invention shall be limited by the specific proportions of the composition above set forth, except in so far as included in the accompanying claims.

We claim:

1. A lubricant having the character of an elastic gel and comprising a mineral lubricating oil, from 0.5 to 25% of aluminum oleate, and from 1 to 50% of finely powdered asbestos.

2. A lubricant composition having the character of an elastic gel and comprising a mineral lubricating oil, from 0.5 to 5% of aluminum oleate, from 1 to 50% of asbestos, and a small proportion not exceeding 3% of degras.

3. A lubricant having the character of an elastic gel and comprising a cylinder oil, from 15 to 23% of finely powdered asbestos, and from 2½ to 5% of aluminum oleate.

4. A lubricant having the character of an elastic gel and comprising a mineral lubricating oil, from 0.5 to 25% of a gelling metallic soap, whereby a gel structure is produced, and from 1 to 50% of finely powdered asbestos.

5. A lubricant having the character of an elastic gel and comprising a mineral lubricating oil, from 0.5 to 25% of a gelling metallic soap whereby a gel structure is produced, from 1 to 50% of asbestos, and a small proportion not exceeding 3% of degras.

WALTER D. HODSON.
ROY E. COLEMAN.